United States Patent
Lee et al.

(10) Patent No.: US 8,901,912 B2
(45) Date of Patent: Dec. 2, 2014

(54) BOOTSTRAP CAPACITOR DETECTING CIRCUIT AND BOOTSTRAP DC-DC CONVERTER THEREOF

(71) Applicant: Anpec Electronics Corporation, Hsin-Chu (TW)

(72) Inventors: Tsung-Kuan Lee, Hsinchu County (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 157 days.

(21) Appl. No.: 13/745,864

(22) Filed: Jan. 21, 2013

(65) Prior Publication Data

US 2014/0152275 A1    Jun. 5, 2014

(30) Foreign Application Priority Data

Dec. 3, 2012 (TW) .............................. 101145356 A

(51) Int. Cl.
  *H02J 3/12* (2006.01)
  *G05F 1/00* (2006.01)
  *H02M 3/07* (2006.01)
  *G05F 1/46* (2006.01)
(52) U.S. Cl.
  CPC ..................................... *G05F 1/468* (2013.01)
  USPC ............ 323/288; 323/242; 323/282; 327/589

(58) Field of Classification Search
  USPC ............................ 323/242, 282, 288; 327/589
  See application file for complete search history.

(56) References Cited

U.S. PATENT DOCUMENTS

| | | | |
|---|---|---|---|
| 6,836,173 B1 * | 12/2004 | Yang | 327/390 |
| 2003/0002352 A1 * | 1/2003 | Kim | 365/189.11 |
| 2005/0116748 A1 * | 6/2005 | Deppe | 327/112 |
| 2008/0012546 A1 * | 1/2008 | Nagaya et al. | 323/282 |
| 2008/0218141 A1 * | 9/2008 | Lu et al. | 323/282 |
| 2009/0315595 A1 * | 12/2009 | Nakagawa | 327/109 |
| 2010/0123511 A1 * | 5/2010 | Strzalkowski et al. | 327/530 |
| 2010/0259233 A1 * | 10/2010 | Cheng | 323/265 |
| 2011/0018613 A1 * | 1/2011 | Wang | 327/530 |

* cited by examiner

*Primary Examiner* — Adolf Berhane
*Assistant Examiner* — Gary Nash
(74) *Attorney, Agent, or Firm* — Winston Hsu; Scott Margo

(57) ABSTRACT

A bootstrap capacitor detecting circuit includes a current source, for providing a discharging current; a first switch, for conducting connection between a system voltage and a bootstrap voltage node according to a power-on-reset signal, to charge the bootstrap voltage node; a second switch, for conducting connection between a current source and the bootstrap voltage node according to the power-on-reset signal, to discharge the bootstrap voltage node; and a detecting unit, for determining whether a bootstrap capacitor is connected normally according to a bootstrap voltage of the bootstrap voltage node after the current source discharges the bootstrap voltage node.

13 Claims, 5 Drawing Sheets

US 8,901,912 B2

BOOTSTRAP CAPACITOR DETECTING CIRCUIT AND BOOTSTRAP DC-DC CONVERTER THEREOF

BACKGROUND OF THE INVENTION

1. Field of the Invention

The present invention relates to a bootstrap capacitor detecting circuit and a bootstrap DC-DC converter, and more particularly, to a bootstrap capacitor detecting circuit and the bootstrap DC-DC converter thereof capable of discharging a bootstrap voltage node and then determining whether a bootstrap capacitor is connected normally according to whether a bootstrap voltage is significantly reduced.

2. Description of the Prior Art

Power supply devices play important roles in the modern information technology. Among all the power supply devices, DC-DC converters have been widely used, and are mainly utilized for providing a stable output voltage for electronic elements.

In short, please refer to FIG. 1, which is a schematic diagram of a conventional bootstrap DC-DC converter 10. As shown in FIG. 1, when a clock signal $V_{CLF}$ is with logic high to trigger a set terminal S of an SR flip-flop 100, the SR flip-flop 100 continues to output a control signal CON in logic high to a pre-driving unit 102. Therefore, the pre-driving unit 102 controls an upper gate driving unit 104 and a lower gate driving unit 106 to output an upper gate control signal UG and a lower gate control signal LG accordingly, such that the upper gate switch 108 is turned on and the lower gate switch 110 is turned off, to output an inductance current $I_L$ and a corresponding output voltage $V_{OUT}$ for a loading $R_{LOAD}$. Then, when a feedback voltage $V_F$ (a divided voltage from the output voltage $V_{OUT}$) exceeds a reference voltage VREF, an error amplifier 112 outputs an error signal EAO to indicate a pulse width modulation (PWM) control loop 114 to reset a reset terminal R of the SR flip-flop 100, such that the SR flip-flog 100 outputs the control signal CON in logic low. Therefore, the pre-driving unit 102 turns off the upper gate switch 108 and turns on the lower gate switch 110 accordingly until the clock signal $V_{CLK}$ switches to another logic high to trigger the set terminal S of the SR flip-flop 100. Then, the above operations are repeated.

When the lower gate control signal LG is with logic high such that the lower gate switch 110 is turned on, a switch 116 (including a body diode 118) conducts connection between a system voltage PVCC and a bootstrap capacitor $C_{BOOT}$ to charge the bootstrap capacitor $C_{BOOT}$. Therefore, when the control signal CON is with logic high to turn on the upper gate switch 108, a driving voltage of the upper gate driving unit 104 is high enough to turn on the upper gate switch 108, wherein a bootstrap voltage $V_{BOOT}$ of a bootstrap voltage node BOOT, which is coupled to an input terminal of a driving voltage of the upper gate driving unit 104, is an input voltage $V_{IN}$ plus a voltage across the bootstrap capacitor $C_{BOOT}$ (i.e., the system voltage PVCC), and the drain-source voltage of the upper gate switch 108 is the bootstrap voltage $V_{BOOT}$. The operation of the bootstrap DC-DC converter 10 is well-known for those skilled in the art, and hence the details are omitted herein.

For this structure, if the bootstrap capacitor $C_{BOOT}$ is not connected normally during the manufacturing process (such as false welding or lose efficacy, that is, the bootstrap capacitor $C_{BOOT}$ is ineffective, causing the system voltage PVCC to charge parasitic capacitor), the upper gate driving unit 104 can not be effectively driven by the bootstrap voltage $V_{BOOT}$ to completely turn on the upper gate switch 108. Therefore, when the upper gate switch 108 outputs the inductance current $I_L$, the upper gate switch 108 could be burned out due to large power. Thus, there is a need for improvement of the prior art.

SUMMARY OF THE INVENTION

It is therefore a primary objective of the present invention to provide a bootstrap capacitor detecting circuit and the bootstrap DC-DC converter thereof capable of discharging a bootstrap voltage node and then determining whether a bootstrap capacitor is connected normally according to whether a bootstrap voltage is significantly reduced.

The present invention discloses a bootstrap capacitor detecting circuit for a bootstrap DC-DC converter. The bootstrap capacitor detecting circuit comprises a current source, for providing a discharging current; a first switch, coupled between a system voltage and a bootstrap voltage node, for conducting connection between a system voltage and a bootstrap voltage node according to a power-on-reset signal, to charge the bootstrap voltage node; a second switch, coupled between the current source and the bootstrap voltage node, for conducting connection between a current source and the bootstrap voltage node according to the power-on-reset signal, to discharge the bootstrap voltage node; and a detecting unit, for determining whether a bootstrap capacitor is connected normally according to a bootstrap voltage of the bootstrap voltage node after the current source discharges the bootstrap voltage node.

The present invention further discloses a bootstrap DC-DC converter, comprising a bootstrap capacitor; an upper gate driving unit, wherein an input terminal of a driving voltage coupled to a bootstrap voltage node; and a bootstrap capacitor detecting circuit. The bootstrap capacitor detecting circuit comprises a current source, for providing a discharging current; a first switch, coupled between a system voltage and a bootstrap voltage node, for conducting connection between a system voltage and a bootstrap voltage node according to a power-on-reset signal, to charge the bootstrap voltage node; a second switch, coupled between the current source and the bootstrap voltage node, for conducting connection between a current source and the bootstrap voltage node according to the power-on-reset signal, to discharge the bootstrap voltage node; and a detecting unit, for determining whether a bootstrap capacitor is connected normally according to a bootstrap voltage of the bootstrap voltage node after the current source discharges the bootstrap voltage node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
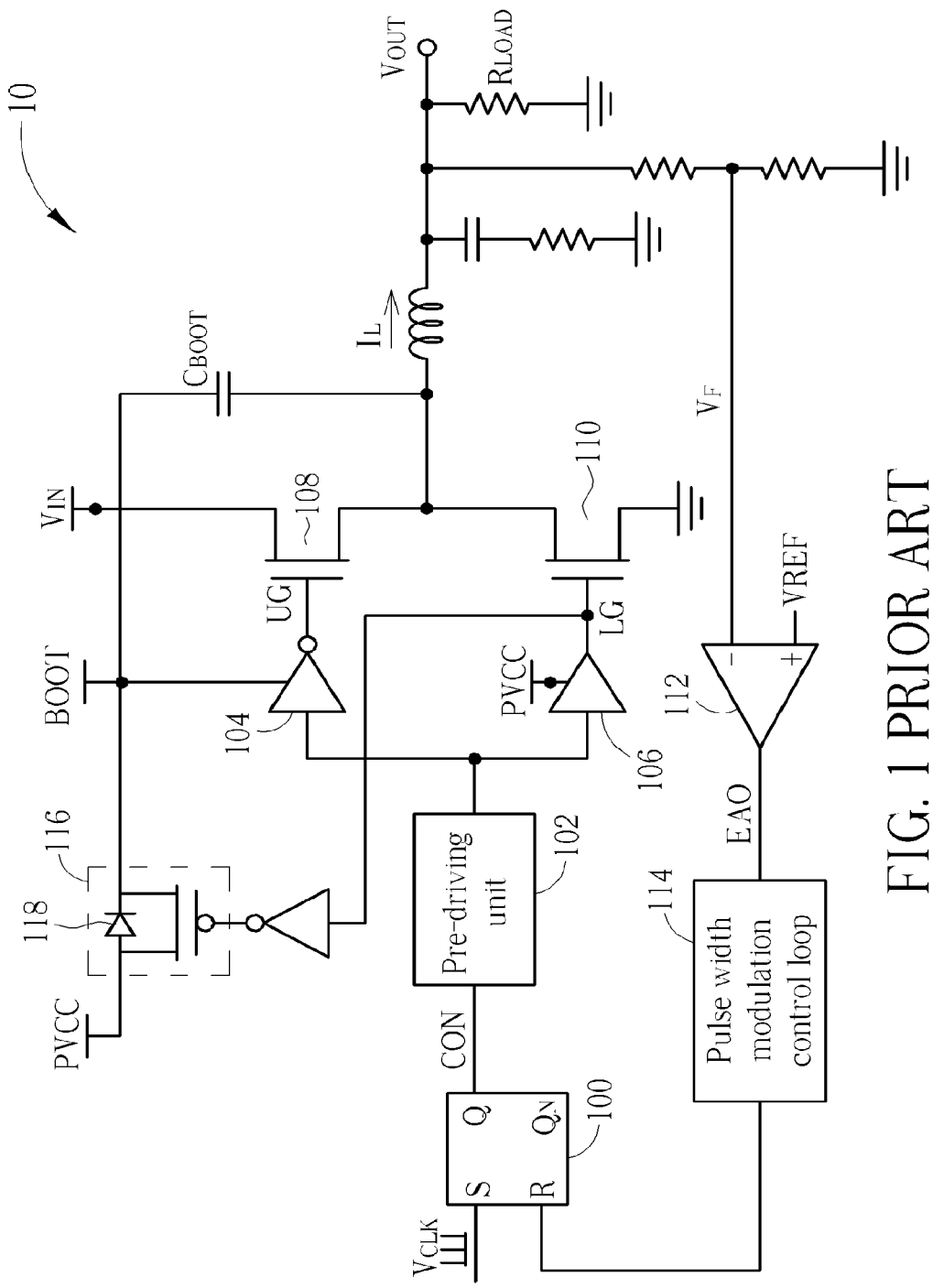
FIG. 1 is a schematic diagram of a conventional bootstrap DC-DC converter.
Figure 2:
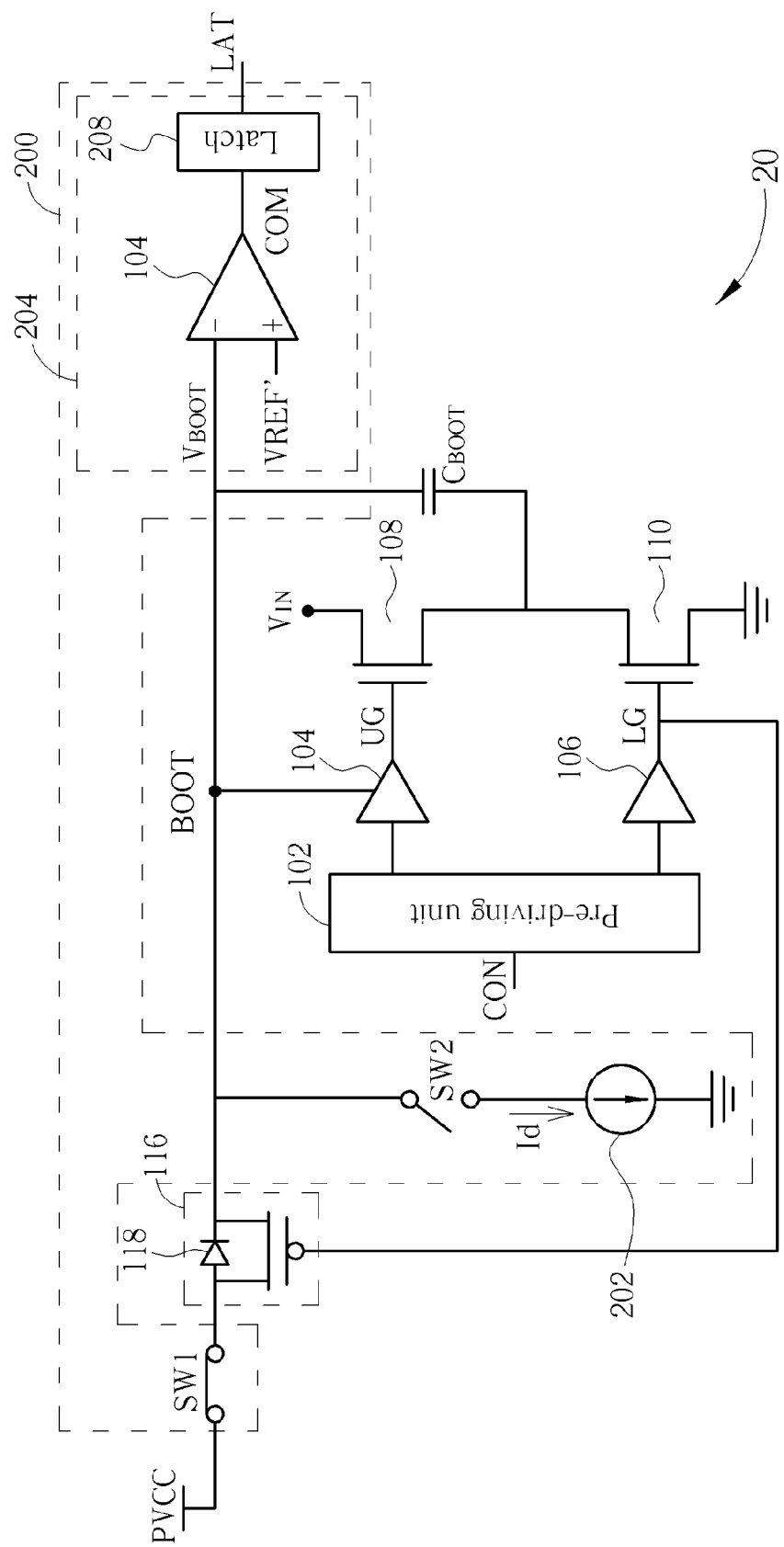
FIG. 2 is a partial schematic diagram of a bootstrap DC-DC converter according to an embodiment of the present invention.

Please refer to FIG. 2, which is a partial schematic diagram of a bootstrap DC-DC converter 20 according to an embodiment of the present invention. The bootstrap DC-DC converter 20 and the bootstrap DC-DC converter 10 are similar in parts, so elements with the same function are illustrated by the same symbol. For simplicity, only partial circuit of the bootstrap DC-DC converter 20 is illustrated in FIG. 2, and other circuits of the bootstrap DC-DC converter 20 not illustrated in FIG. 2 are the same as the corresponding parts in the bootstrap DC-DC converter 10. Main difference between the bootstrap DC-DC converter 20 and the bootstrap DC-DC converter 10 is that the bootstrap DC-DC converter 20 further includes a bootstrap capacitor detecting circuit 200, for determining whether a bootstrap capacitor is connected normally.

In detail, the bootstrap capacitor detecting circuit 200 includes a current source 202, switches SW1 and SW2, and a detecting unit 204. The current source 202 is coupled between switch SW2 and a ground terminal, and provides a discharging current $I_d$. The switch SW1 is coupled between the system voltage PVCC and the bootstrap voltage node BOOT (via the switch 116), and conducts connection between the system voltage PVCC and the bootstrap voltage node BOOT according to a power-on-reset signal POR, to charge the bootstrap voltage node BOOT. The switch SW2 is coupled between the current source 202 and the bootstrap voltage node BOOT, and conducts connection between the current source 202 and the bootstrap voltage node BOOT according to the power-on-reset signal POR, to discharge the bootstrap voltage node BOOT. The detecting unit 204 determines whether the bootstrap capacitor $C_{BOOT}$ is connected normally according to a bootstrap voltage $V_{BOOT}$ of the bootstrap voltage node BOOT after the current source 202 discharges the bootstrap voltage node BOOT. The bootstrap voltage node BOOT is coupled to the input terminal of the driving voltage of the upper gate driving unit 104, and the discharging current $I_d$ is much less than a capacity of the bootstrap capacitor $C_{BOOT}$.

In such a situation, if the bootstrap capacitor $C_{BOOT}$ is connected normally, the current source 202 discharges the large bootstrap capacitor $C_{BOOT}$ via the bootstrap voltage node BOOT, and thus the bootstrap voltage $V_{BOOT}$ is only slightly reduced so that the bootstrap voltage $V_{BOOT}$ is still greater than a reference voltage VREF', from which the detecting unit 204 can determine the bootstrap capacitor $C_{BOOT}$ is connected normally accordingly. On the other hand, if the bootstrap capacitor $C_{BOOT}$ is not connected normally, the current source 202 discharges small parasitic capacitor via the bootstrap voltage node BOOT, and thus the bootstrap voltage $V_{BOOT}$ is reduced to the ground voltage level so that the bootstrap voltage $V_{BOOT}$ is less than the reference voltage VREF', from which the detecting unit 204 can determine the bootstrap capacitor $C_{BOOT}$ is not connected normally accordingly. As a result, the present invention can discharge the bootstrap voltage node BOOT, and then determine whether the bootstrap capacitor $C_{BOOT}$ is connected normally according to whether the bootstrap voltage $V_{BOOT}$ is reduced significantly, to prevent the upper gate switch 108 from burning out due to large power.

Figure 3:
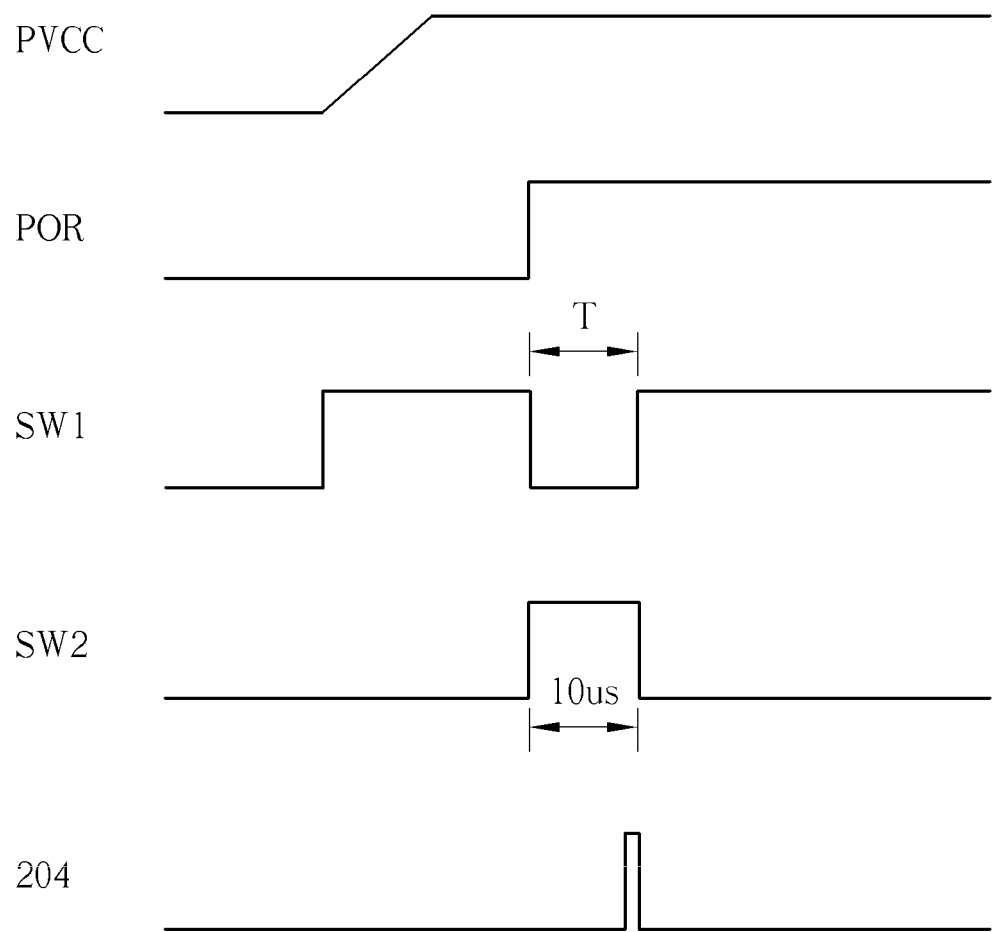
FIG. 3 is a signal diagram of the bootstrap DC-DC converter shown in FIG. 2.

Specifically, please refer to FIG. 3, which is a signal diagram of the bootstrap DC-DC converter 20 shown in FIG. 2. As shown in FIG. 3, before the initialization and the power-on-reset signal POR changes a state (the power-on-reset signal POR changes a state to indicate the circuit to start operation after the system voltage PVCC reaches to a specific value), the switch SW1 is with logic high to conduct connection between the system voltage PVCC and the bootstrap voltage node BOOT for charging the bootstrap voltage node BOOT so that the bootstrap voltage $V_{BOOT}$ rises along with the system voltage PVCC. At this moment, the switch SW2 is with logic low to cut off the connection between the current source 202 and the bootstrap voltage node BOOT to prevent the current source 202 from discharging the bootstrap voltage node BOOT. Then, during a specific period T (such as 10 µs) after the power-on-reset signal POR changes a state, the switch SW1 is with logic low to cut off the connection between the system voltage PVCC and the bootstrap voltage node BOOT for stopping charging the bootstrap voltage node BOOT. At this moment, the switch SW2 is with logic high to conduct connection between the current source 202 and the bootstrap voltage node BOOT for discharging the bootstrap voltage node BOOT. In such a situation, the detecting unit 204 can determine whether the bootstrap capacitor $C_{BOOT}$ is connected normally according to the bootstrap voltage $V_{BOOT}$ before an end of the specific period T (After the specific period T, the switch SW1 is with logic high again to conduct connection between the system voltage PVCC and the bootstrap voltage node BOOT).

For example, please continue referring to FIG. 2. As shown in FIG. 2, the detecting unit 204 includes a comparator 206 and a latch 208. An input terminal of the comparator 206 is coupled to the bootstrap voltage node BOOT for receiving the bootstrap voltage $V_{BOOT}$, and another input terminal is coupled to the reference voltage VREF' for outputting a comparison result COM. The latch 208 generates a latch signal LAT to indicate whether the bootstrap capacitor $C_{BOOT}$ is connected normally according to the comparison result COM.

Figure 4A:
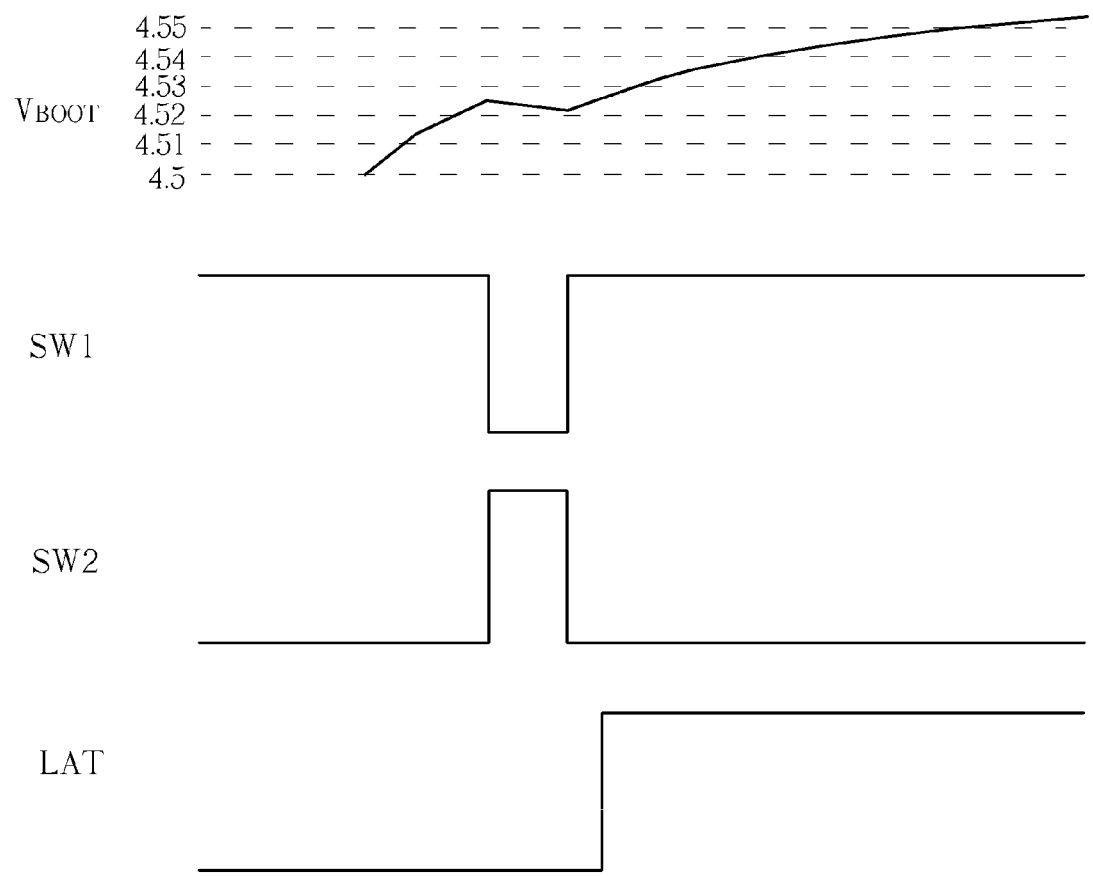
FIG. 4A and FIG. 4B, are signal diagrams of the bootstrap DC-DC converter shown in FIG. 2 when a bootstrap capacitor is connected normally and when a bootstrap capacitor is not connected normally, respectively.
Figure 4B:
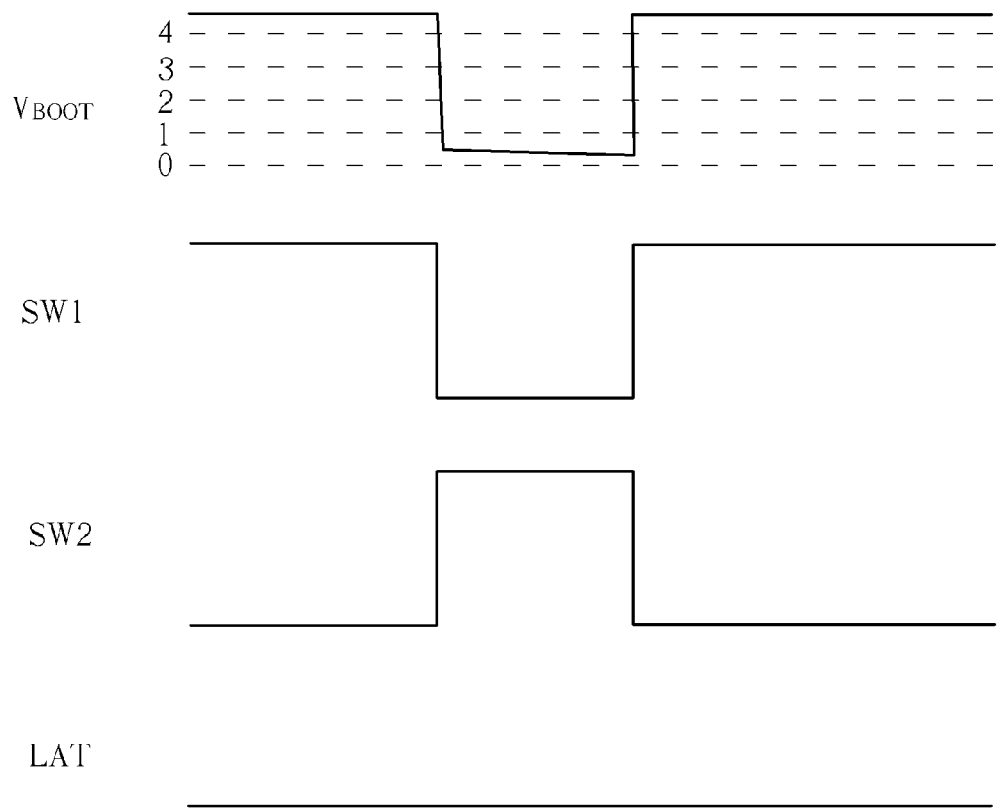

Specifically, please refer to FIG. 4A and FIG. 4B, which are signal diagrams of the bootstrap DC-DC converter 20 when the bootstrap capacitor $C_{BOOT}$ is connected normally and when the bootstrap capacitor $C_{BOOT}$ is not connected normally, respectively. As shown in FIG. 4A, when the bootstrap capacitor $C_{BOOT}$ is connected normally, the bootstrap capacitor $C_{BOOT}$ is charged by the system voltage PVCC first, and then discharged by the current source 202 during the specific period T. Since the discharging current $I_d$ is much less than the capacity of the bootstrap capacitor $C_{BOOT}$, the bootstrap voltage $V_{BOOT}$ is only slightly reduced (approximately from 4.525V to 4.522V). At this moment, the comparator 206 keeps determining the bootstrap voltage $V_{BOOT}$ to be greater than the reference voltage VREF', and outputs the comparison result COM in logic high. Therefore, the latch 208 maintains the comparison result COM before the end of the specific period T for generating a latch signal LAT with logic high to indicate the bootstrap capacitor $C_{BOOT}$ is connected normally (the latch signal LAT in FIG. 4A shows that the latch signal LAT changes to logic high after an end of a specific period due to circuit delay).

On the other hand, as shown in FIG. 4B, when the bootstrap capacitor $C_{BOOT}$ is not connected normally, only parasitic capacitor is charged by the system voltage PVCC, and then discharged via the current source 202 during the specific period T. Since a capacity of parasitic capacitance is much less than the discharging current $I_d$, the bootstrap voltage $V_{BOOT}$ is reduced approximately to the voltage level of a ground terminal. At this moment, the comparator 206 keeps determining the bootstrap voltage $V_{BOOT}$ to be less than the reference voltage VREF', and outputs the comparison result COM in logic low. Therefore, the latch 208 maintains the comparison result COM before the end of the specific period T and generates a latch signal LAT with logic low to indicate the bootstrap capacitor $C_{BOOT}$ is not connected normally.

Noticeably, the spirit of the present invention is to discharge the bootstrap voltage node BOOT, and then determine whether the bootstrap capacitor $C_{BOOT}$ is connected normally according to whether the bootstrap voltage is significantly reduced, to prevent the upper gate switch 108 from burning out due to large power. Those skilled in the art can make modifications or alterations accordingly. For example, the timing of operations of the switch SW1 and SW2 is not limited to the above embodiment, as long as the bootstrap voltage node BOOT is charged and then discharged for the detecting unit 204 to determine whether the bootstrap voltage $V_{BOOT}$ is significantly reduced. Besides, the implementation of the detecting unit 204 is also not limited to the above circuit, as long as the detecting unit 204 can determine whether the bootstrap voltage $V_{BOOT}$ is significantly reduced after the bootstrap voltage node BOOT is discharged.

In the prior art, if the bootstrap capacitor $C_{BOOT}$ is not connected normally during the manufacturing process (such as false welding or lose efficacy, that is, the bootstrap capacitor $C_{BOOT}$ is ineffective, causing the system voltage PVCC to charge parasitic capacitor), the upper gate driving unit 104 can not be effectively driven by the bootstrap voltage $V_{BOOT}$ to completely turn on the upper gate switch 108. Therefore, when the upper gate switch 108 outputs the inductance current $I_L$, the upper gate switch 108 could be burned out due to large power. In comparison, the present invention can discharge the bootstrap voltage node BOOT, and then determine whether the bootstrap capacitor $C_{BOOT}$ is connected normally according to whether the bootstrap voltage $V_{BOOT}$ is reduced significantly, to prevent the upper gate switch 108 from burning out due to large power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bootstrap capacitor detecting circuit for a bootstrap DC-DC converter, comprising:
    a current source, for providing a discharging current;
    a first switch, coupled between a system voltage and a bootstrap voltage node, for conducting connection between the system voltage and the bootstrap voltage node according to a power-on-reset signal, to charge the bootstrap voltage node;
    a second switch, coupled between the current source and the bootstrap voltage node, for conducting connection between the current source and the bootstrap voltage node according to the power-on-reset signal, to discharge the bootstrap voltage node; and
    a detecting unit, for determining whether a bootstrap capacitor is connected normally according to a bootstrap voltage of the bootstrap voltage node after the current source discharges the bootstrap voltage node;
    wherein the first switch conducts the connection between the system voltage and the bootstrap voltage node to charge the bootstrap voltage node, and the second switch cuts off the connection between the current source and the bootstrap voltage node before the power-on-reset signal changes a state.

2. The bootstrap capacitor detecting circuit of claim 1, wherein the discharging current is much less than a capacity of the bootstrap capacitor.

3. The bootstrap capacitor detecting circuit of claim 1, wherein the bootstrap voltage node is coupled to an input terminal of a driving voltage of an upper gate driving unit.

4. The bootstrap capacitor detecting circuit of claim 1, wherein the first switch cuts off the connection between the system voltage and the bootstrap voltage node to stop charging the bootstrap voltage node, and the second switch conducts the connection between the current source and the bootstrap voltage node to discharge the bootstrap voltage node during a specific period after the power-on-reset signal changes a state.

5. The bootstrap capacitor detecting circuit of claim 4, wherein the detecting unit determines whether a bootstrap capacitor is connected normally according to a bootstrap voltage before an end of the specific period.

6. The bootstrap capacitor detecting circuit of claim 5, wherein the detecting unit determines the bootstrap capacitor is not connected normally if the bootstrap voltage is less than a reference voltage and determines the bootstrap capacitor is connected normally if the bootstrap voltage is greater than the reference voltage.

7. The bootstrap capacitor detecting circuit of claim 1, wherein the detecting unit comprises:
    a comparator, comprising an input terminal coupled to the bootstrap voltage node and another input terminal coupled to a reference voltage for outputting a comparison result; and
    a latch, for generating a latch signal to indicate whether a bootstrap capacitor is connected normally according to the comparison result.

8. A bootstrap DC-DC converter, comprising:
    a bootstrap capacitor;
    an upper gate driving unit, comprising an input terminal of a driving voltage coupled to a bootstrap voltage node; and
    a bootstrap capacitor detecting circuit, comprising:
        a current source, for providing a discharging current;
        a first switch, coupled between a system voltage and a bootstrap voltage node, for conducting connection between the system voltage and the bootstrap voltage node according to a power-on-reset signal, to charge the bootstrap voltage node;
        a second switch, coupled between the current source and the bootstrap voltage node, for conducting connection between the current source and the bootstrap voltage node according to the power-on-reset signal, to discharge the bootstrap voltage node; and
        a detecting unit, for determining whether a bootstrap capacitor is connected normally according to a bootstrap voltage of the bootstrap voltage node after the current source discharges the bootstrap voltage node;
        wherein the first switch conducts the connection between the system voltage and the bootstrap voltage node to charge the bootstrap voltage node, and the second switch cuts off the connection between the current source and the bootstrap voltage node before the power-on-reset signal changes a state.

9. The bootstrap DC-DC converter of claim 8, wherein the discharging current is much less than a capacity of the bootstrap capacitor.

10. The bootstrap DC-DC converter of claim 8, wherein the first switch cuts off the connection between the system voltage and the bootstrap voltage node to stop charging the bootstrap voltage node, and the second switch conducts the connection between the current source and the bootstrap voltage node to discharge the bootstrap voltage node during a specific period after the power-on-reset signal changes a state.

11. The bootstrap DC-DC converter of claim 10, wherein the detecting unit determines whether a bootstrap capacitor is connected normally according to a bootstrap voltage before an end of the specific period.

12. The bootstrap DC-DC converter of claim 11, wherein the detecting unit determines the bootstrap capacitor is not connected normally if the bootstrap voltage is less than a reference voltage and determines the bootstrap capacitor is connected normally if the bootstrap voltage is greater than the reference voltage.

13. The bootstrap DC-DC converter of claim 8, wherein the detecting unit comprises:
- a comparator, comprising an input terminal coupled to the bootstrap voltage node and another input terminal coupled to a reference voltage for outputting a comparison result; and
- a latch, for generating a latch signal to indicate whether a bootstrap capacitor is connected normally according to the comparison result.

* * * * *